US012051844B1

(12) United States Patent
Tsironis

(10) Patent No.: US 12,051,844 B1
(45) Date of Patent: Jul. 30, 2024

(54) ADJUSTABLE DIRECTIONAL COUPLER

(71) Applicant: Christos Tsironis, Kirkland (CA)

(72) Inventor: Christos Tsironis, Kirkland (CA)

( * ) Notice: Subject to any disclaimer, the term of this patent is extended or adjusted under 35 U.S.C. 154(b) by 427 days.

(21) Appl. No.: 17/518,225

(22) Filed: Nov. 3, 2021

(51) Int. Cl.
*H01P 5/18* (2006.01)
*H01P 3/10* (2006.01)
*H01P 5/04* (2006.01)

(52) U.S. Cl.
CPC .................. *H01P 5/18* (2013.01); *H01P 3/10* (2013.01); *H01P 5/04* (2013.01)

(58) Field of Classification Search
CPC .... H01P 5/04; H01P 5/183; H01P 5/18; H01P 3/10; G01R 31/2601
USPC .................................................. 333/109–111
See application file for complete search history.

(56) References Cited

U.S. PATENT DOCUMENTS 7,135,941 B1 11/2006 Tsironis
7,282,926 B1 10/2007 Verspecht et al.

OTHER PUBLICATIONS

"What is a RF directional coupler?", Wayback Machine capture date Aug. 24, 2018 (Year: 2018).*
U.S. Appl. No. 16/860,760, Tsironis, C.
Load Pull for Power Devices [online], Microwaves101 [retrieved on Mar. 14, 2017]. Retrieved from Internet <URL: https://www.microwaves101.com/encyclopedias/load-pull-for-power-devices>.
"Computer Controlled Microwave Tuner", Product Note 41, Focus Microwaves, Jan. 1998.
S-parameters [online], Microwaves 101 [retrieved on Apr. 28, 2020]. Retrieved from Internet <URL: https://www.microwaves101.com/encyclopedias/s-parameters>.
Directional Couplers [online], Microwaves101 [retrieved on Oct. 17, 2018]. Retrieved from Internet <URL: http://www.microwaves101.com/encyclopedia/directionalcouplers.cfm>.
What is a Vector Network Analyzer, VNA: the basics [online], electronics notes, [retrieved on Jun. 13, 2019]. Retrieved from Internet <URL: https://www.electronics-notes.com/articles/test-methods/rf-vector-network-analyzer-vna/what-is-a-vna.php>.
Fourier analysis [online], Wikepidia [retrieved on Apr. 28, 2020]. Retrieved from Internet <URL : https://en.wikipedia.org/wiki/Fourier_analysis>.

* cited by examiner

*Primary Examiner* — Rakesh B Patel

(57) ABSTRACT

A simple low-loss high-directivity wire coupler uses a wire over ground transmission airline structure and the center conductor of a folded low diameter coaxial cable ending in a wire loop sensor, which is inserted into the ground wall of the transmission line, branching into a coupled and an isolated port. The coupling factor is adjustable by laterally displacing the conductor of the transmission line in the area of the sensor without affecting the characteristic impedance. Directivity and residual reflection are maintained. Higher, capacitively induced, electrical current, because of the confined zone between signal conductor and ground wall, compares favorably with the antiphase magnetically induced current component in the wire loop sensor and leads to increased coupling and directivity over a frequency range up to at least 70 GHz.

8 Claims, 15 Drawing Sheets

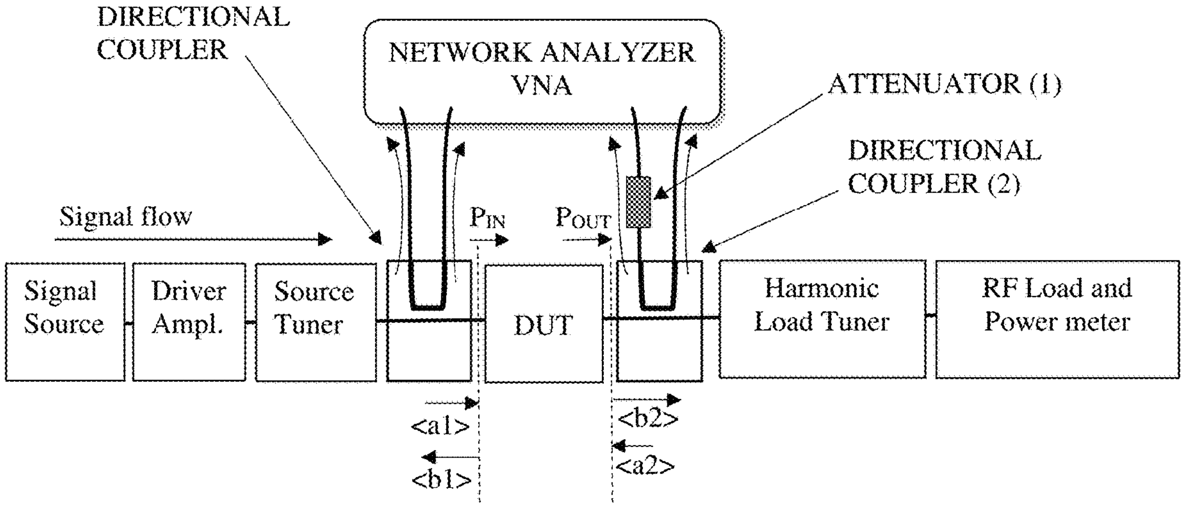
FIG. 1: Prior art

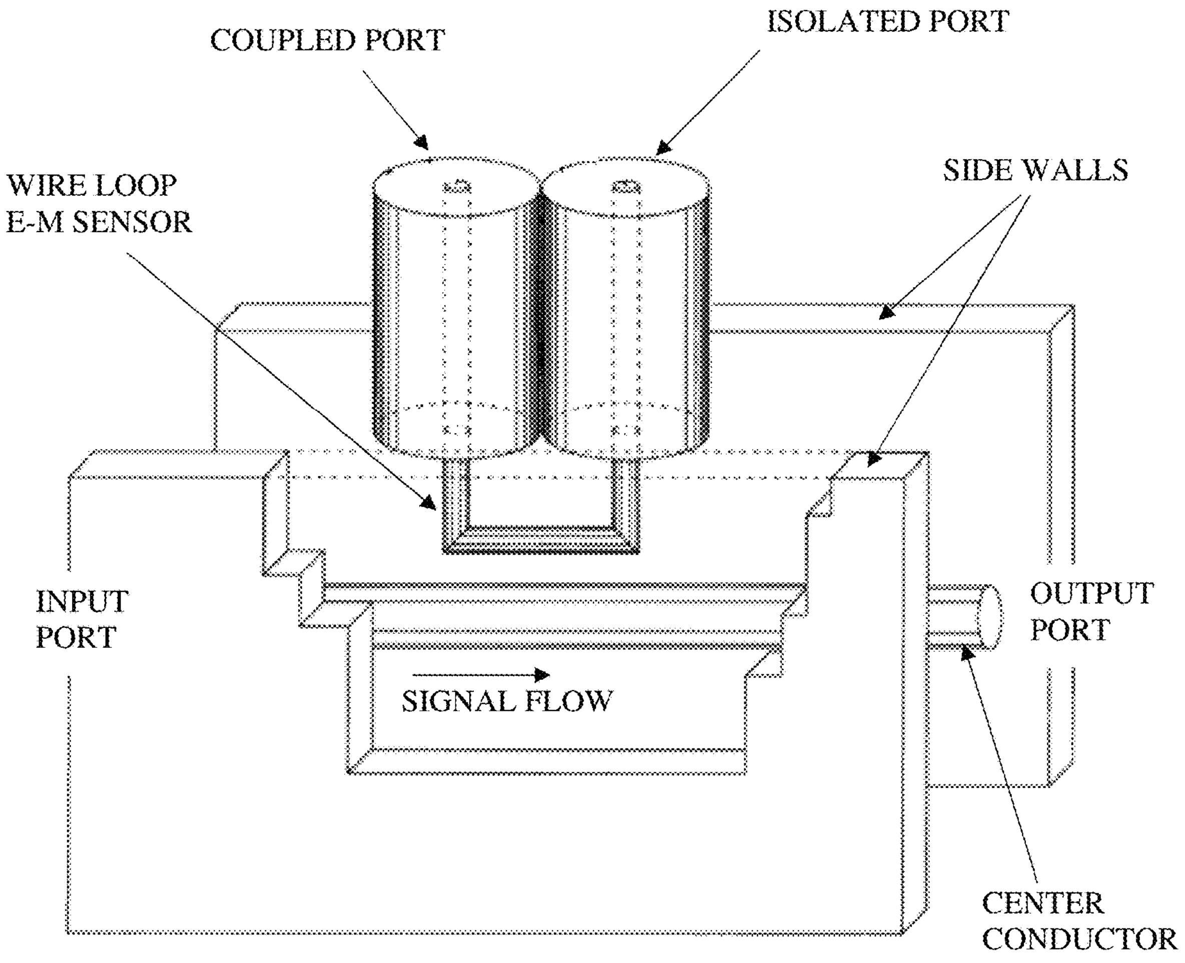
FIG. 2: Prior art

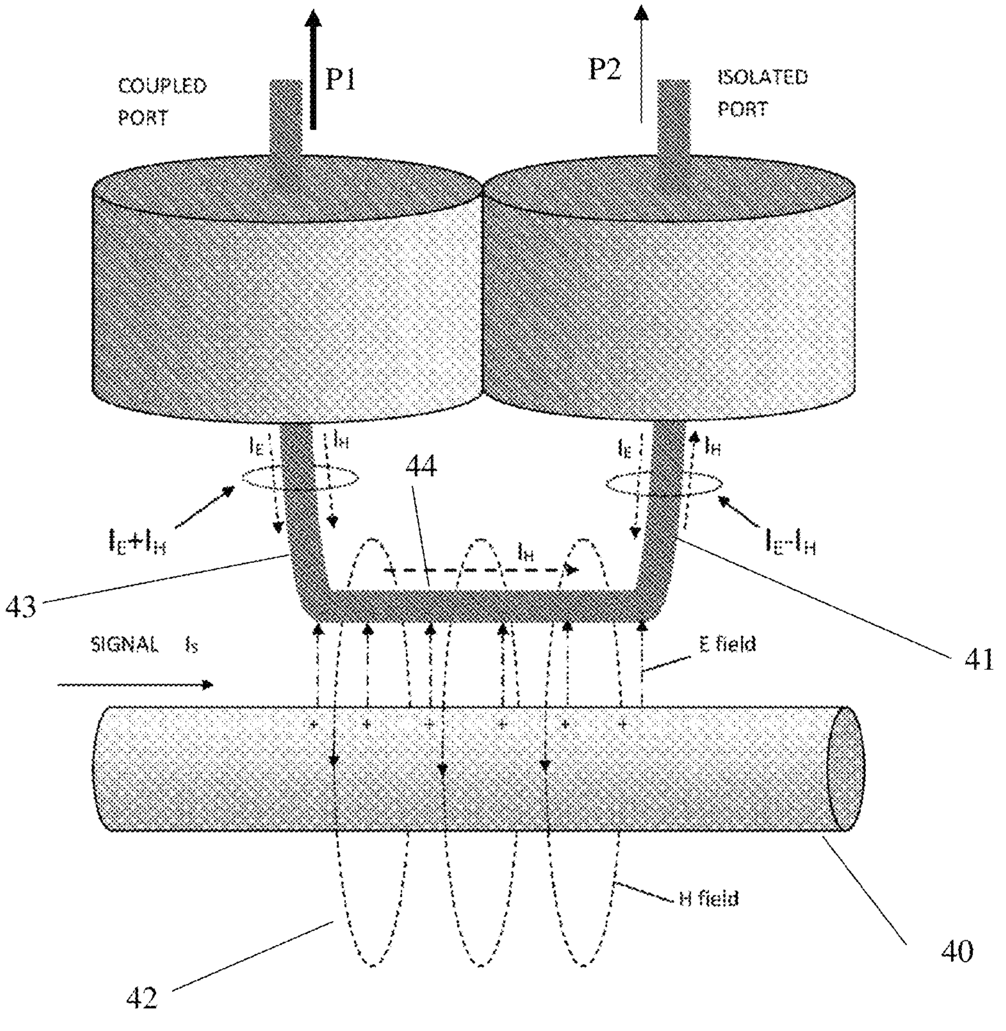
FIG. 3: Prior art

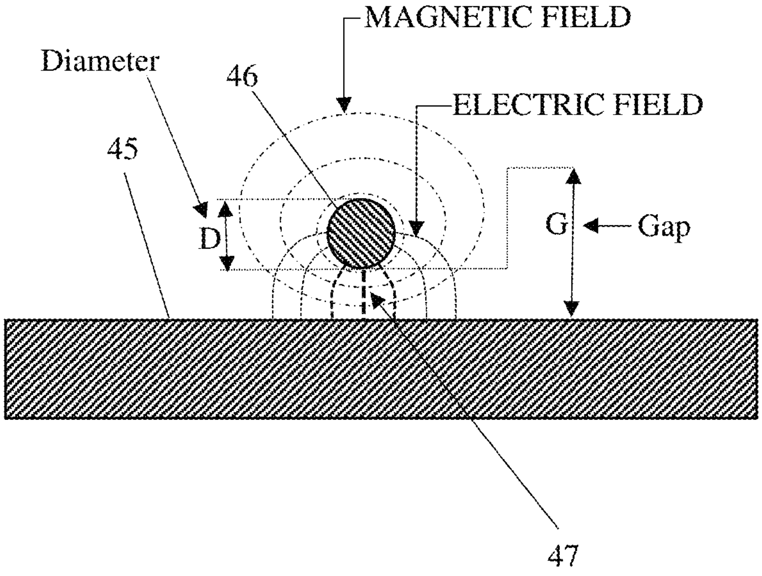
FIG. 4: Prior art

FIG.5A: Prior art
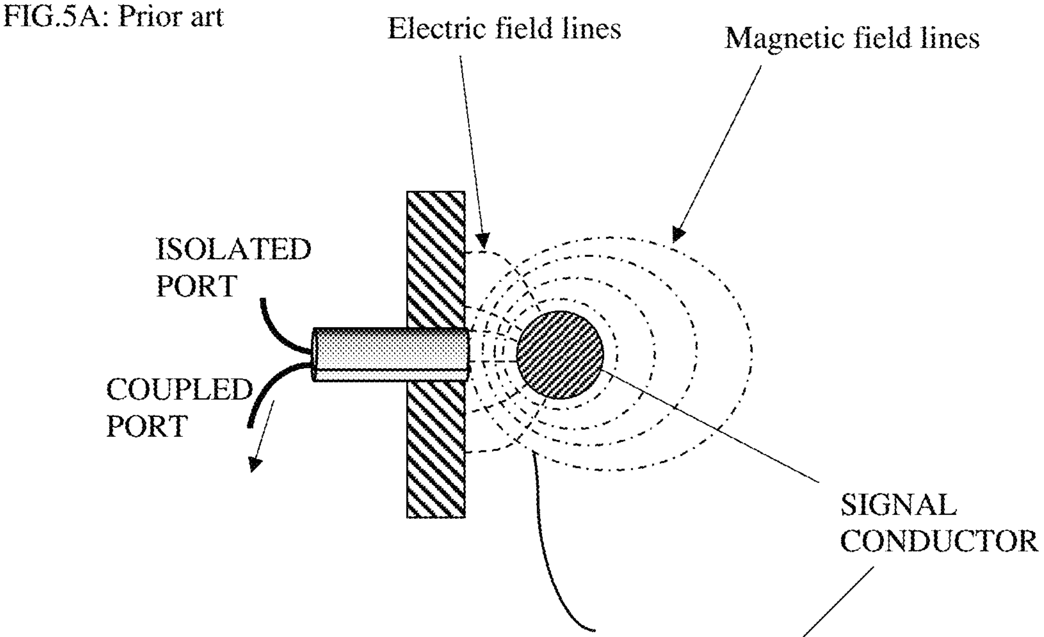
FIG. 5B: Prior art
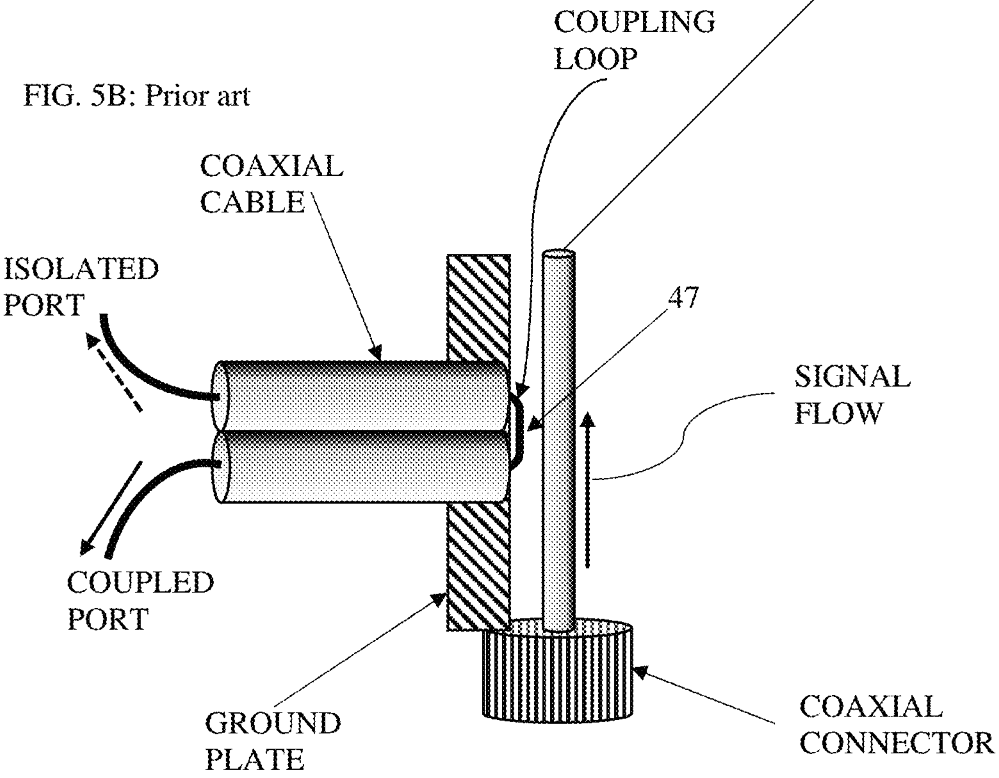

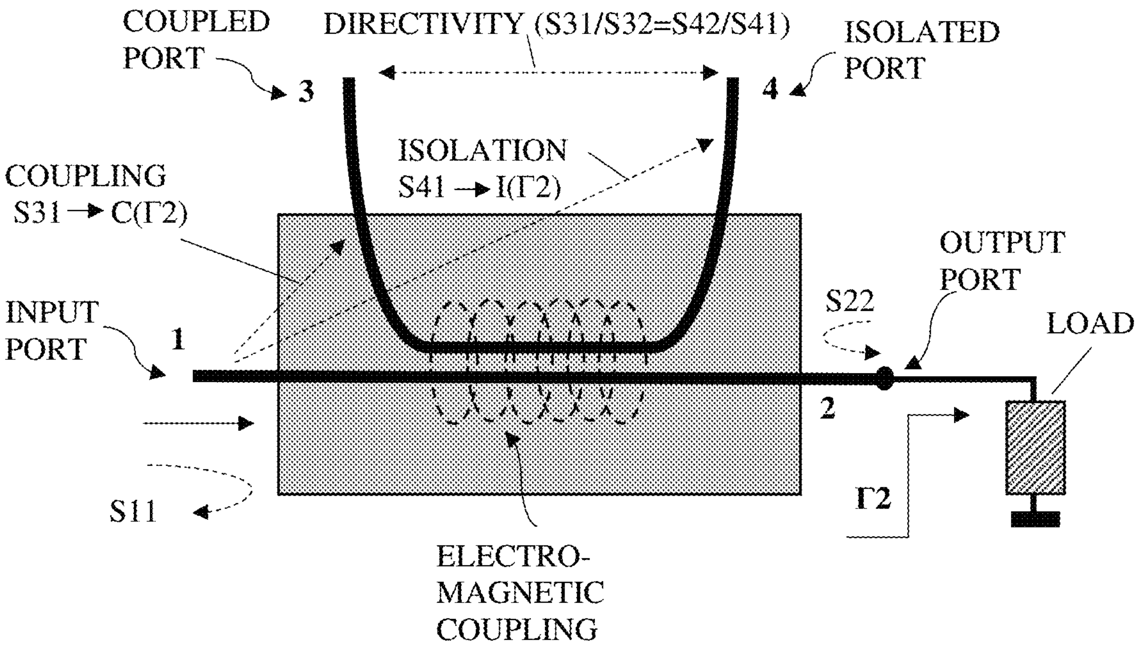
FIG. 6: Prior art

ADJUSTABLE DIRECTIONAL COUPLER

PRIORITY CLAIM

Not Applicable

CROSS-REFERENCE TO RELATED ARTICLES

1. Load Pull for Power Devices [online], Microwaves101 [retrieved on 2017-03-14]. Retrieved from Internet <URL: https://www.microwaves101.com/encyclopedias/load-pull-for-power-devices>.
2. "Computer Controlled Microwave Tuner", Product Note 41, Focus Microwaves, January 1998.
3. Tsironis, C. U.S. patent application Ser. No. 16/860,760 (allowed): "A simple directional coupler", FIG. 9A, 9B.
4. S-parameters [online], Microwaves101 [retrieved on 2020-04-28]. Retrieved from Internet <URL: https://www.microwaves101.com/encyclopedias/s-parameters>.
5. Directional Couplers [online], Microwaves101 [retrieved on 2018-10-17]. Retrieved from Internet <URL: http://www.microwaves101.com/encyclopedia/directionalcouplers.cfm>.
6. Verspecht et al., U.S. Pat. No. 7,282,926, "Method and an apparatus for characterizing a high-frequency device-under-test in a large signal impedance tuning environment".
7. What is a Vector Network Analyzer, VNA: the basics [online], electronics notes, [retrieved on 2019-06-13]. Retrieved from Internet <URL: https://www.electronics-notes.com/articleshest-methods/rf-vector-network-analyzer-vna/what-is-a-vna.php>.
8. Tsironis, C., U.S. Pat. No. 7,135,941, "Triple probe automatic slide screw load pull tuner and method".
9. Fourier analysis [online], Wikepidia [retrieved on 2020-04-28]. Retrieved from Internet <URL: https://en.wikipedia.org/wiki/Fourier analysis>.

FIELD OF THE INVENTION

This invention relates to general testing of microwave two-ports (transistors, DUT) using linear and non-linear measurement techniques especially under controlled impedances at the input and output of the transistors (load Pull measurement, see ref. 1) and also measuring and analyzing the large signal behavior of a device under test (DUT).

BACKGROUND OF THE INVENTION

A popular method for testing and characterizing microwave transistors in high power nonlinear operation condition is "load pull" and "source pull" (see ref. 1). Load pull or source pull are measurement techniques employing microwave tuners (see ref. 2) and other microwave test equipment. The microwave tuners in particular are used to manipulate the microwave impedance conditions under which the Device Under Test (DUT, or transistor) is tested (FIG. 1). Wideband bi-directional signal couplers (see ref. 5) are needed to detect the signal waves propagating along the transmission line towards <a1>, <a2> and away <b1>, <b2> from the DUT (FIG. 1) including their harmonic components in order to allow performing harmonic Fourier analysis (see ref. 9) and reconstruct the real-time non-linear transistor response. Further-on the instantaneous voltage-current trajectory of a transistor, typically called the "load-line", (see ref. 6) will depend on the complex impedance presented to the transistor using harmonic tuners (see ref. 8). A setup that allows this test is a "harmonic load pull setup" shown in FIG. 1.

DESCRIPTION OF PRIOR ART

Bi-directional signal couplers have been known since long time (see ref. 5); They detect forward <a> and reverse <b> travelling waves on the transmission line and transfer the measured data to the vector network analyzer (VNA, FIG. 1, see ref. 7). In order for the data to be valid, the couplers must be calibrated by measuring their scattering (s−) parameters before (see ref. 4) and de-embed to the DUT reference plane. Since the typical DUT has gain. the signal power POUT is bigger than PIN often by more than one or two orders of magnitude (>10-20 dB) (FIG. 1). This means that the VNA detectors must process different signal levels which may stress their dynamic range (linearity) and affect the accuracy. The preferred solution for this has been to add and exchange attenuators 1 into the lead paths to the VNA. This can be avoided if the directional couplers are adjustable, allowing balanced, optimum, and most accurate signal power reading. Since any measured quantity M is equal to an instrument reading R, times a scaling factor N: $M=N*R$, and N being constant only in an absolute linear condition with a measurement error $\Delta M=N(R)*\Delta R+R*\Delta N$; it follows that the best reading sensitivity without affecting the accuracy is reached when $N=1$ or when the reading and the measured quantities are balanced. This has hitherto been tentatively achieved using and changing the attenuators 1 in the coupled branch of the output coupler 2 (FIG. 1).

BRIEF DESCRIPTION OF THE INVENTION

Signal couplers are in general bi-directional i.e., injected signal is detected at two sampling ports, a coupled port, extracting the larger part of the signal and an isolated port, extracting the lesser part of the signal. The opposite happens in reverse direction (see FIG. 6). The ratio between the larger and lesser signal amount is called directivity. The couplers dealt with here are bi-directional couplers. The coupler of the present invention (FIGS. 5A and 5B) uses the wire-over-ground (WOG) transmission line structure; the advantages offered by this structure are: a) the simplicity of the transmission airline (one ground-plate instead of two as in prior art FIG. 2, see ref. 6) offering the benefit of relaxed parallelism of the side-wall requirements, which are mandatory in a slabline (FIG. 2), and b) the stronger concentration of electric field in the zone 47 between signal conductor and closer-by ground surface (FIGS. 4, 5B), which leads to higher capacitive coupling, magnetic field concentration and induced electric currents; the coupler is made by inserting a U-shaped electro-magnetic wire loop sensor with a bottom section and two branches into a hole in the ground-plate at the level of the signal conductor and extending its branches into coaxial cables leading to the coupled and isolated coaxial ports. The bottom section runs parallel to the signal conductor. This wire over ground structure is preferred because the coupling factor can easily be controlled by simply deflecting slightly the signal conductor from the immediate area of the U-shaped sensor, keeping it always parallel to the ground plate to avoid affecting the characteristic impedance (FIG. 14).

BRIEF DESCRIPTION OF THE SEVERAL VIEWS OF THE DRAWINGS

The invention and its mode of operation will be more clearly understood from the following detailed description when read with the appended drawings in which:

FIG. 1 depicts prior art, a harmonic load pull test setup for measuring power contours and real time incident and reflected waves and load reflection factor of a DUT, using bi-directional couplers and network analyzer.

FIG. 2 depicts prior art, signal coupler of type "wave-probe".

FIG. 3 depicts prior art, electromagnetic field interactions in a wave-probe type of coupler including magnetically induced and capacitively coupled currents inside the coupling loop of the wire coupler.

FIG. 4 depicts prior art, electric and magnetic field distribution in a transmission line using the "wire over ground, WOG" concept, and the "wire diameter over distance to ground" ratio yielding characteristic impedance Zo=50 Ohms.

FIGS. 5A through 5B depict a wire over ground (WOG) high coupling and directivity coupler; FIG. 5A depicts a cross section through the signal conductor at the wire loop level; FIG. 5B depicts a side view.

FIG. 6 depicts prior art, definition of transmission, reflection, coupling and isolation RF parameters in a bi-directional coupler.

FIG. 8A depicts manual control; FIG. 8B depicts automated, stepper motor control.

DETAILED DESCRIPTION OF THE INVENTION

Figure 7:
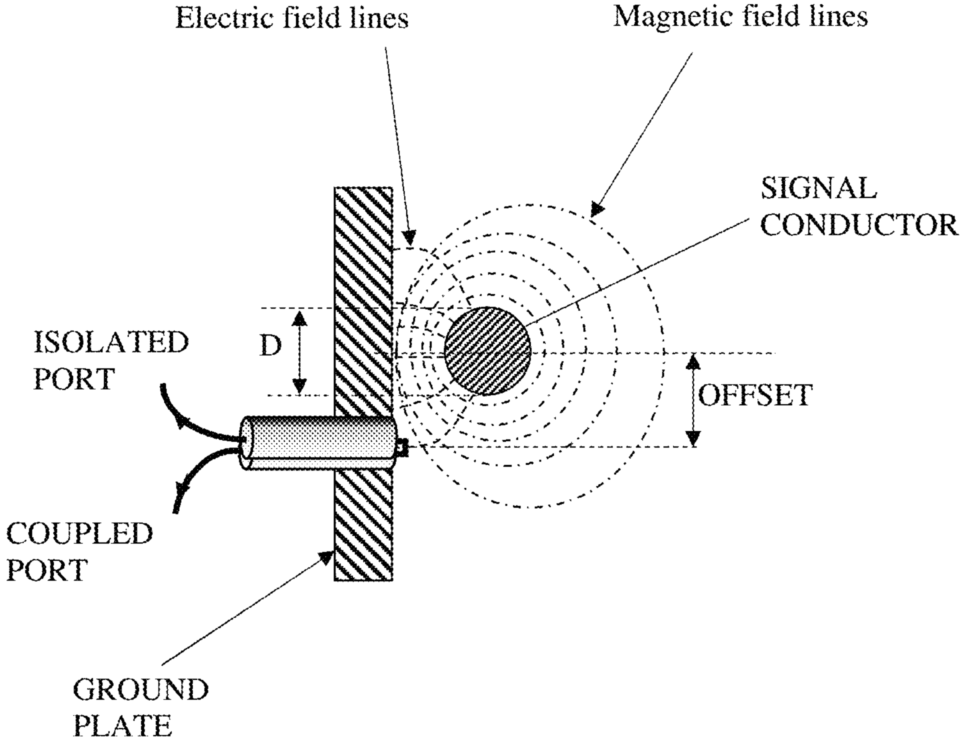
FIG. 7 depicts controlling the coupling factor by deflecting the signal conductor from the proximity area of the U formed wire sensor.

The electromagnetic field interactions and coupling relations of the U-shaped sensor are shown in FIG. 3 and the RF quantity definitions in FIG. 6: the signal traveling on the signal conductor 40 creates a magnetic field 42, which couples into the bottom section 44 of the wire loop and induces the current $I_H$; the capacitive coupling between the wire loop and the signal conductor creates two almost identical currents $I_E$ flowing in the same direction into the branches of the U formed wire loop. The currents $I_E$ and $I_H$ add in the coupled branch 43 and subtract in the isolated branch 41 of the coupler. This creates the difference in powers P1 and P2 and results in the directivity of this coupler. In the wire over ground type of transmission line, the signal conductor is closer to the ground plate than in the slabline structure of FIG. 2. Magnetic coupling is therefore even stronger and causes better compensation of current $I_E$-$I_H$ in the isolated branch 41. This is why this coupler configuration has better directivity than the original structure of FIG. 2 (see ref. 3).

The wire over ground transmission line (FIG. 4) requires the signal conductor 46 to run closer to the ground plate 45 in order to bend the electric field stronger towards ground. The gap G is smaller than the signal conductor (SC) diameter. As can be seen in FIGS. 5A and 5B this structure and proximity 47 creates optimum conditions for coupling control by just deflecting the signal conductor parallel to the ground plate slightly away (OFFSET) of the wire loop (FIG. 7). The electric and magnetic fields around the signal conductor remain intact and so does the characteristic impedance, only the coupling changes.

Figure 8A:
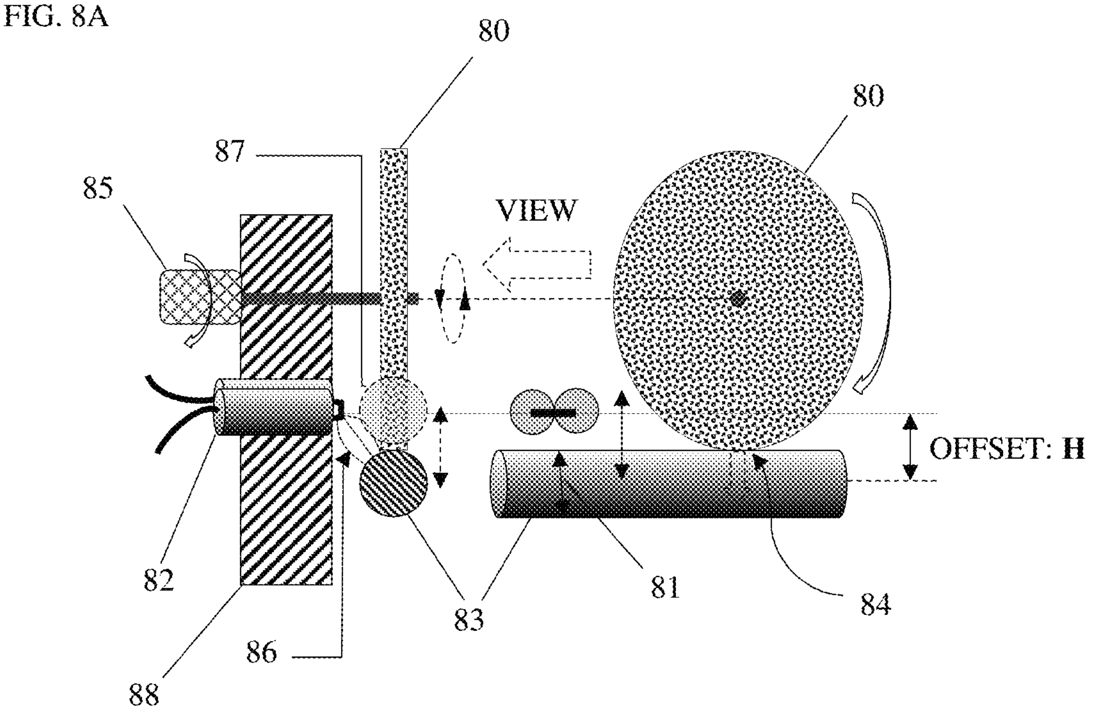
FIGS. 8A through 8B depict control mechanisms for deflecting the signal conductor and controlling the coupling factor using an elliptical or eccentric disc.
Figure 8B:
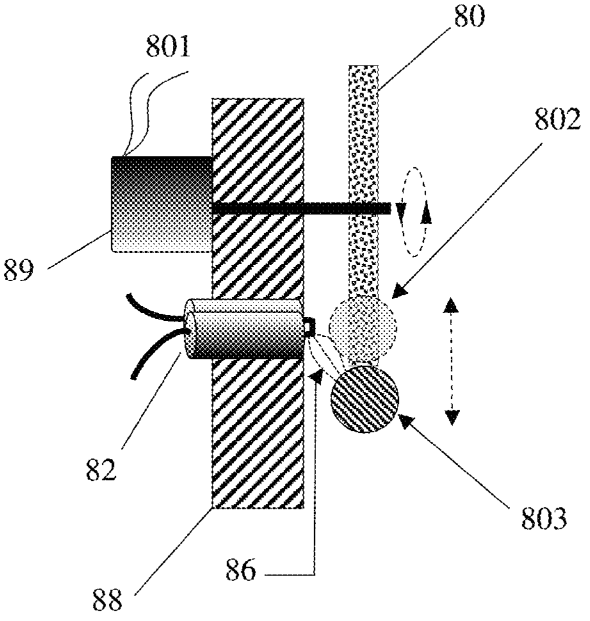
Figure 9:
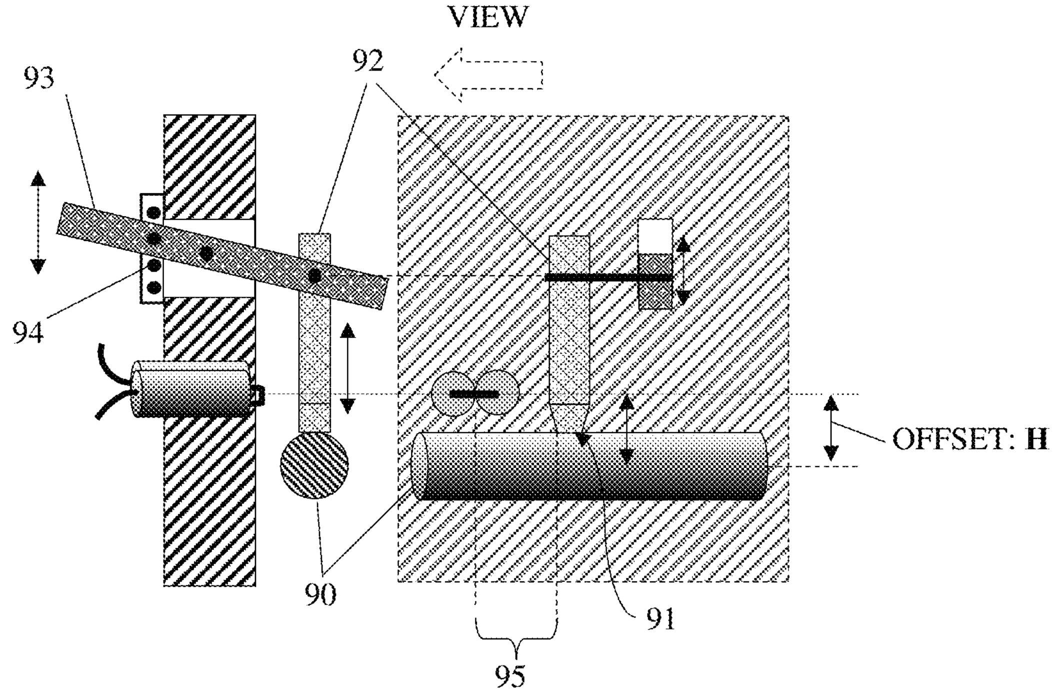
FIG. 9 depicts a control mechanism for deflecting the signal conductor and controlling the coupling factor using a low dielectric stab with discrete settings.

FIGS. 8A, 8B and 9 show two of a number of possible embodiments for deflecting the signal conductor parallel to the ground plane; a low dielectric factor elliptic or eccentrically rotating disc 80 in FIG. 8A, 8B is rotated either by a manual handle 85 or by a remotely controlled 801 stepper motor 89, parallel to the ground plane 88; using stepper motor control allows precise deflecting the signal conductor between the original position 802 and a deflected position 803 and setting of the coupling, in a way that the adjustable coupling factor can be calibrated and allow dynamic balancing of the measurement. The disc 80 touches the signal conductor 83 at the point 84 and deflects it away from the wire coupler 82; the maximum amount of deflection OFFSET H from original position 87 is typically at least as much as the diameter 81 of the signal conductor. The electric field 86 is weakened because of the longer path. It is important to keep the deflected signal conductor parallel to the ground plane to maintain the value of the characteristic impedance Zo=50 Ohm of the transmission line.

FIG. 9 shows an alternative embodiment of the deflection control mechanism. In this case a low dielectric factor stab 92 is controlled by a tilting handle 93, which allows discrete level settings 94; the stab 92 touches the signal conductor 90 at position 91 and pushes it downwards by the OFFSET amount H; the touching point 91 shall be at certain distance 95. The maximum deflection H shall, in no case exceed the elasticity range of the signal conductor, so that when released it rebounds to its original state restoring the original coupling.

Figure 10:
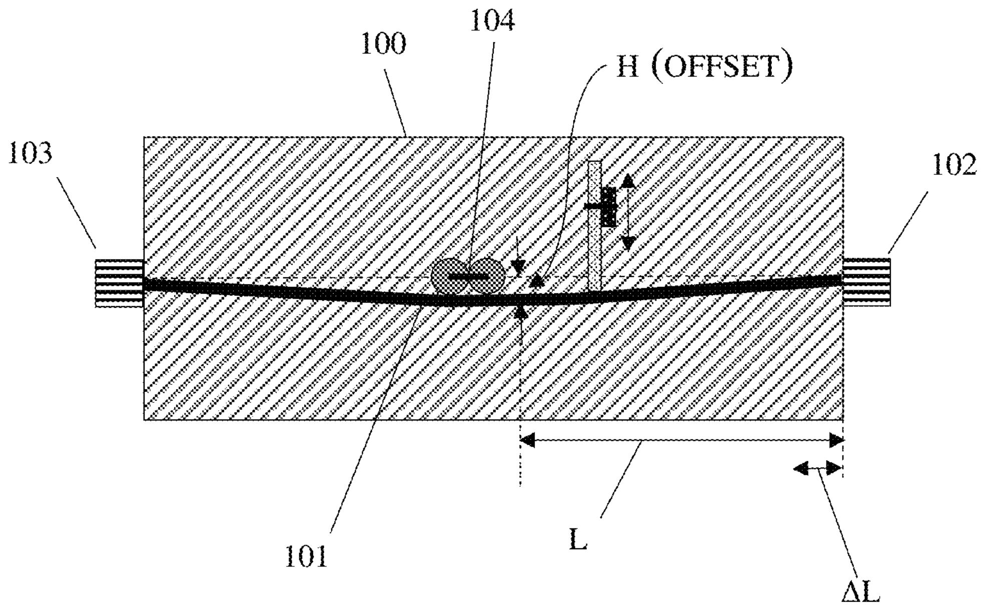
FIG. 10 depicts the relevant structural dimensions involved in controlling the deflection mechanism of the signal conductor.

There may be some concern about the effect of deflection of the signal conductor 101 on the structural integrity of the coupler (103, 102, 100, 104). FIG. 10 shows the relevant dimensions: the deflection H can be calculated from the triangle with one side length L and a shortening ΔL as: $H^2=L^2-(L-\Delta L)^2=2L*\Delta L-(\Delta L)^2$, or $\Delta L=L\pm sqrt(L^2-H^2)$; using some typical numbers: H=1 mm, L=20 mm, yields ΔL=20 mm-19.975 mm=0.025 mm=25 μm; the coaxial connector 102 can easily absorb this length shortening. The coupling control via deflection of the signal conductor within its elasticity range is shown here for a 1 mm conductor of a 70 GHz coupler, is therefore a viable solution.

Figure 11:
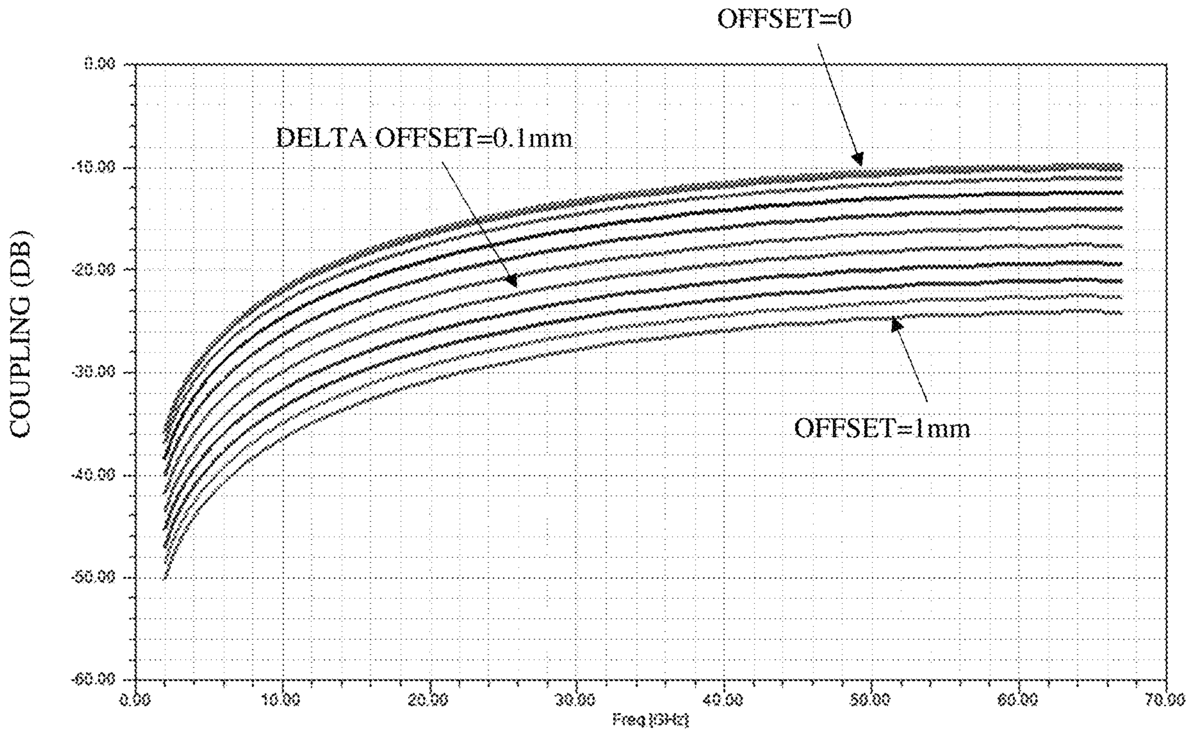
FIG. 11 depicts coupling factor control of the coupler as a function of OFFSET deflection of the signal conductor; maximum deflection OFFSET=SC=signal conductor diameter.
Figure 12:
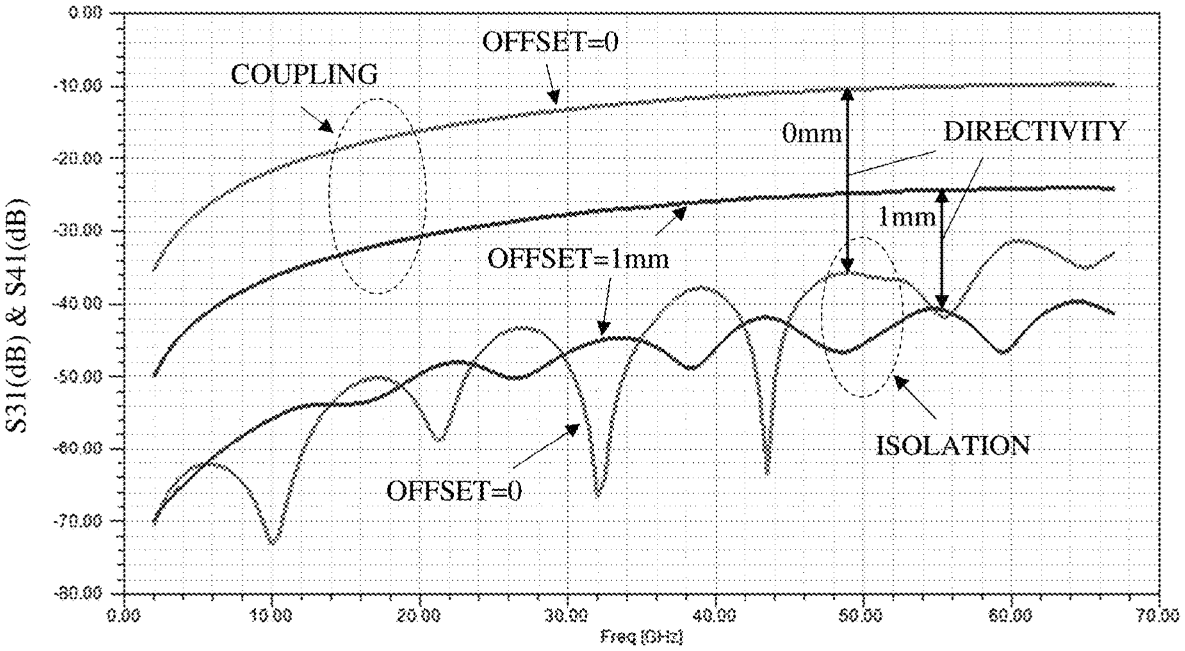
FIG. 12 depicts coupling factor and directivity range of the coupler for minimum (OFFSET=0) and maximum (OFFSET=SC=signal conductor diameter).

The results of the coupling control of the wire over ground directional coupler are shown in FIGS. 11 to 15: FIG. 11 shows the fine control of the coupling factor by deflecting the signal conductor. The change is smooth without any ripple from 2 to 67 or 70 GHz. The resolution is approximately linear 2 dB per 0.1 mm deflection between 0.2 and 1 mm deflection for a total of 14 dB, which is generally adequate for balancing the VNA detectors without using the attenuator 1 (FIG. 1). As shown in FIG. 12 the directivity of the coupler is reduced from the original 26 dB but remains within the acceptable limit of 16 dB.

Figure 13:
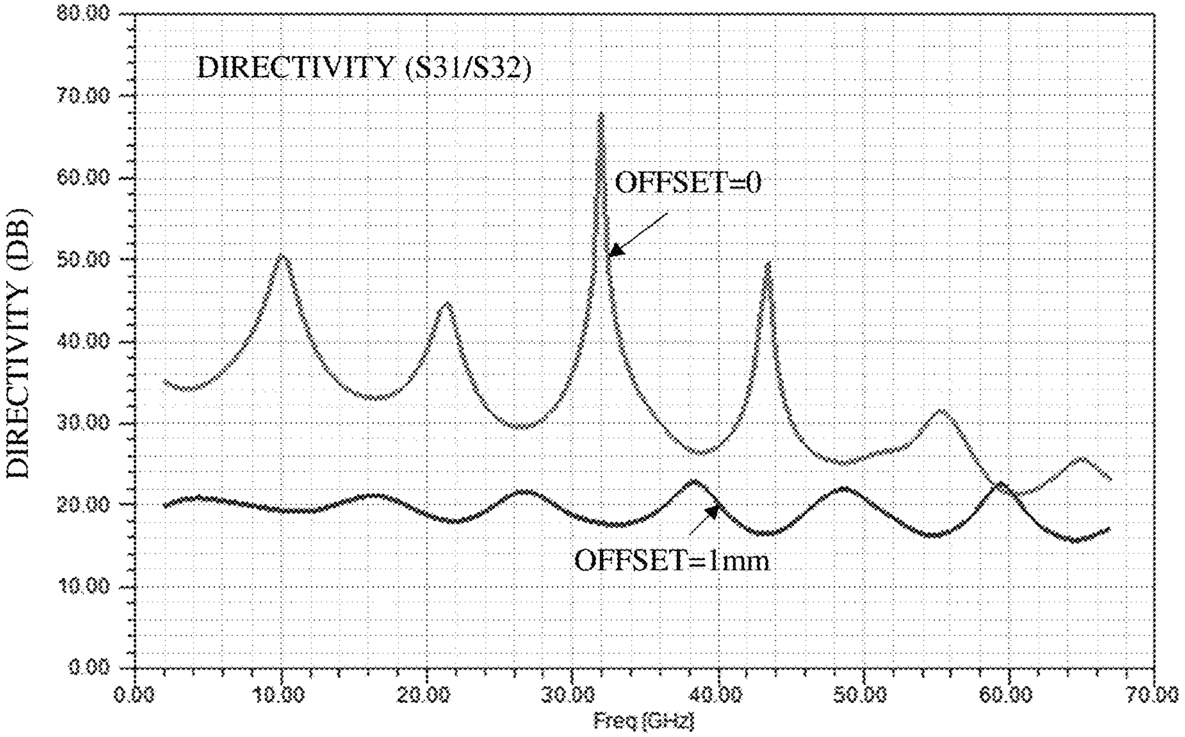
FIG. 13 depicts enlarged view of directivity of the coupler for the minimum and maximum deflection limits of the signal conductor.
Figure 14:
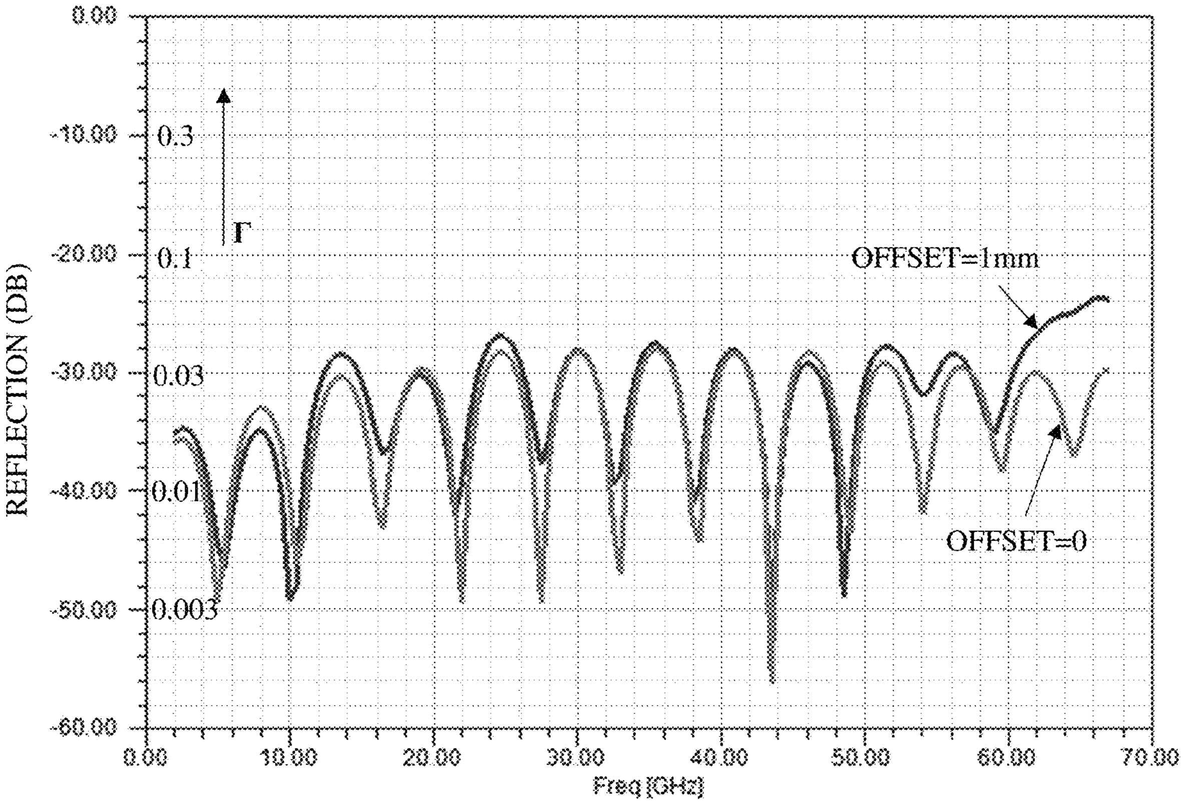
FIG. 14 depicts the residual reflection factor of the coupler for the minimum and maximum deflection limits of the signal conductor.

The directivity is explicitly shown in FIG. 13: when the signal conductor is exactly opposite the wire sensor the directivity is excellent for the reasons presented before (see ref. 3); though the deflected signal conductor still yields typically 20 dB over a large portion of the frequency spectrum up to 40-50 GHz. Instead, the residual reflection factor (FIG. 14) is quasi unaffected, as expected since the signal conductor remains parallel to the ground plane. Only above 65 GHz, probably due to the cutoff of the 1 mm signal conductor, there is some visible degradation.

Figure 15:
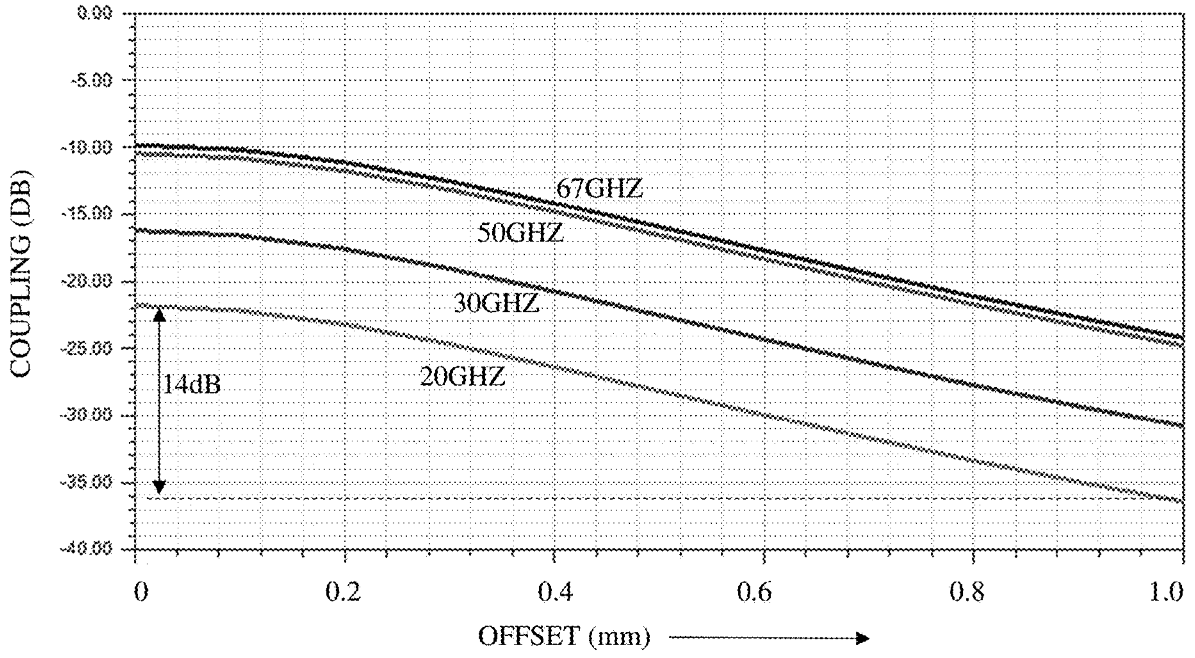
FIG. 15 depicts the deflection effect on coupling factor for various frequencies.

Finally, FIG. 15 shows that the coupling factor can be controlled homogenously through 2-67 GHz by at least 14 dB through deflecting the signal conductor by approximately the same amount as the diameter of the signal conductor itself or by around 2-3% of the coupler length.

In conclusion the new WOG (wire over ground) embodiment is superior in coupling and in directivity to all alternative embodiments and offers simple, efficient coupling factor control without significant detrimental side-effects. Obvious alternatives and modifications to the herein disclosed general concept of coupling control of a WOG transmission line wideband coupler with high coupling and directivity shall not impede in the validity of the invention.

What is claimed is:

1. An adjustable directional RF signal coupler having an input port, an output port, a coupled port, and an isolated port;

the adjustable directional RF signal coupler comprises:

a) a wire-over-ground transmission airline between the input and output ports, the wire-over-ground transmission airline comprising a metallic ground plate and a signal conductor joining the input and output ports, the signal conductor being parallel to the ground plate, and b) a "U" shaped wire loop sensor having a bottom section and two branches, the two branches comprising a first branch and a second branch, the "U" shaped wire loop sensor being coupled electro-magnetically in a non-contacting relationship with the signal conductor, and c) means for controlling a coupling factor between the input port and the coupled port;

wherein the "U" shaped wire loop sensor is inserted in a perpendicular hole into the metallic ground plate and protrudes into an area between the ground plate and the signal conductor with the bottom section extending parallel to the signal conductor, and wherein each branch of the "U" shaped wire loop sensor extends into a center conductor of a coaxial cable, the first branch terminating into the coupled port and the second branch terminating into the isolated port;

and wherein the means for controlling the coupling factor comprise:

a) a device with a low dielectric factor touching the signal conductor close to the bottom section of the "U" shaped wire loop and displacing the signal conductor parallel to the ground plate;

b) means for controlling a position of the low dielectric factor device;

and wherein signal conductor deflection predominantly occurs near the "U" shaped wire loop sensor.

2. The adjustable directional signal coupler of claim 1, wherein the "U" shaped wire loop sensor is inserted in the metallic ground plate in a zone closest to the signal conductor.

3. The adjustable directional signal coupler of claim 1, wherein the signal conductor is cylindrical.

4. The adjustable directional signal coupler of claim 1, wherein a characteristic impedance of the wire over ground transmission airline is 50 Ohms.

5. The adjustable directional signal coupler of claim 1, wherein a deflection range of the signal conductor is at least as large as a diameter of the signal conductor.

6. The adjustable directional signal coupler of claim 5, wherein a maximum deflection range of the signal conductor does not exceed an elasticity range of the signal conductor.

7. The adjustable directional signal coupler of claim 1, wherein the means for controlling the position of the low dielectric factor device allows discrete repeatable settings.

8. The adjustable directional coupler of claim 7, wherein the means for controlling the position of the low dielectric factor device comprises control by a remotely controlled stepper motor.

* * * * *